Nov. 23, 1926.                                              1,607,742
                        B. E. HANEY
                      AUTOMOBILE BED
              Filed April 7, 1924        3 Sheets-Sheet 1
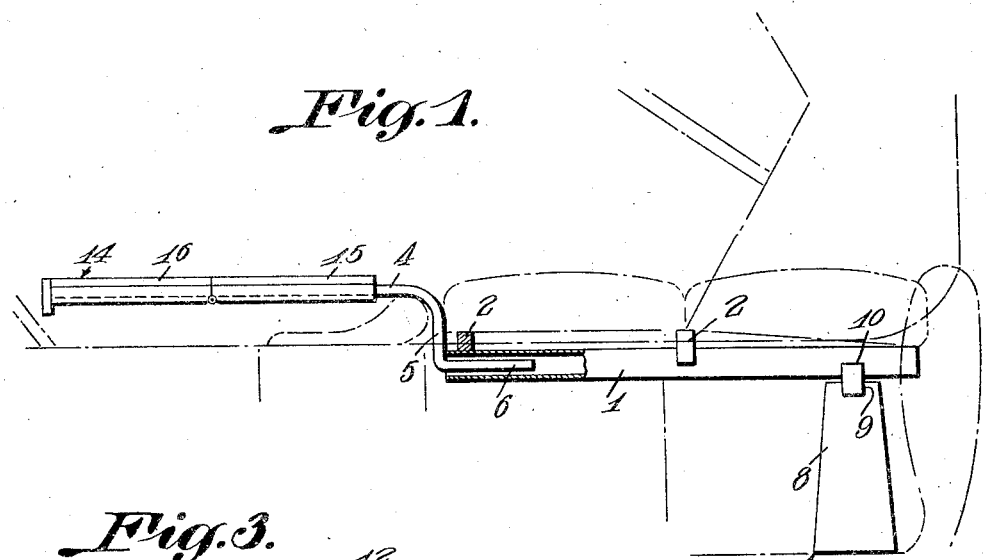
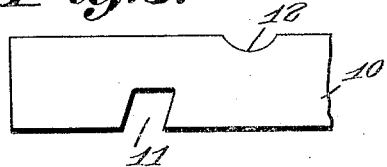
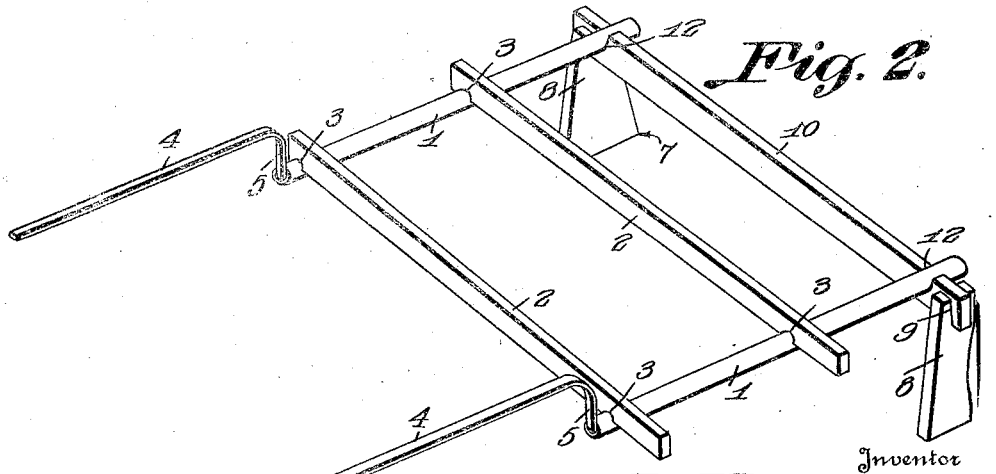
Inventor
B. E. Haney
By C. A. Snow & Co.
Attorneys Nov. 23, 1926.

B. E. HANEY 1,607,742

AUTOMOBILE BED

Filed April 7, 1924

3 Sheets-Sheet 2

Inventor

B. E. Haney

By C. A. Snow & Co.

Attorneys.

Nov. 23, 1926.

B. E. HANEY

AUTOMOBILE BED

Filed April 7, 1924

1,607,742

3 Sheets-Sheet 3

Inventor

B. E. Haney

Patented Nov. 23, 1926.

1,607,742

UNITED STATES PATENT OFFICE.

BURTON E. HANEY, OF PORTLAND, OREGON.

AUTOMOBILE BED.

Application filed April 7, 1924. Serial No. 704,806.

The device forming the subject matter of this application is an automobile bed of that general sort shown in my Patent 1,304,966 granted in 1919.

The device comprises a frame having a foot rest, and one of the improvements contemplated by the invention is the provision of novel means for supporting the rear end of the frame.

Another object is to so construct the device that it can be housed in compact form when not in use.

It is within the province of the disclosure to improve generally, and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 4:
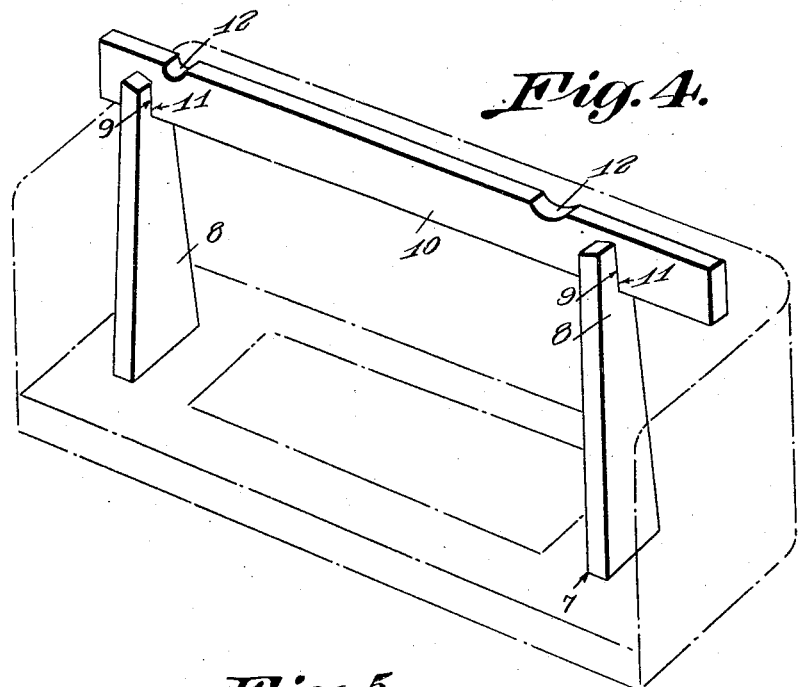
Figure 5:
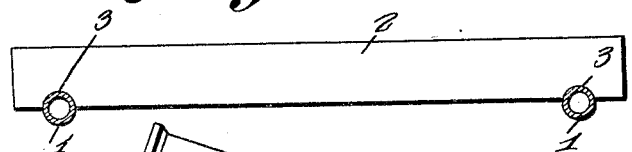
Figure 6:
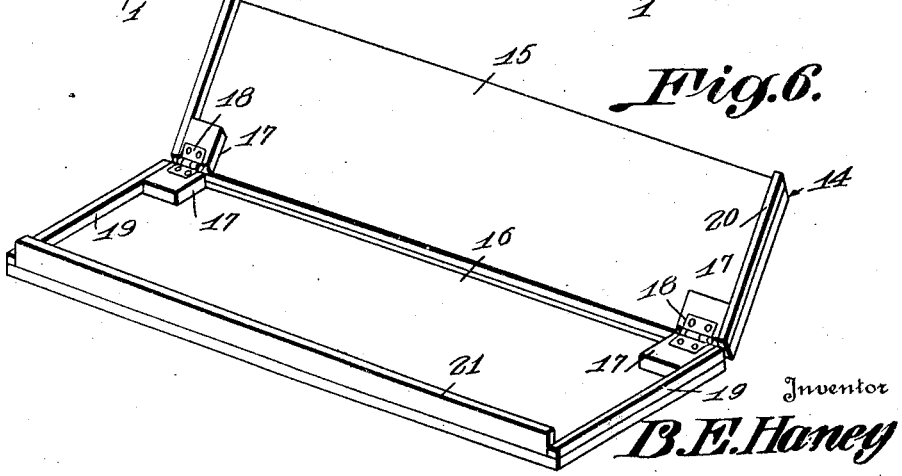
Figure 7:
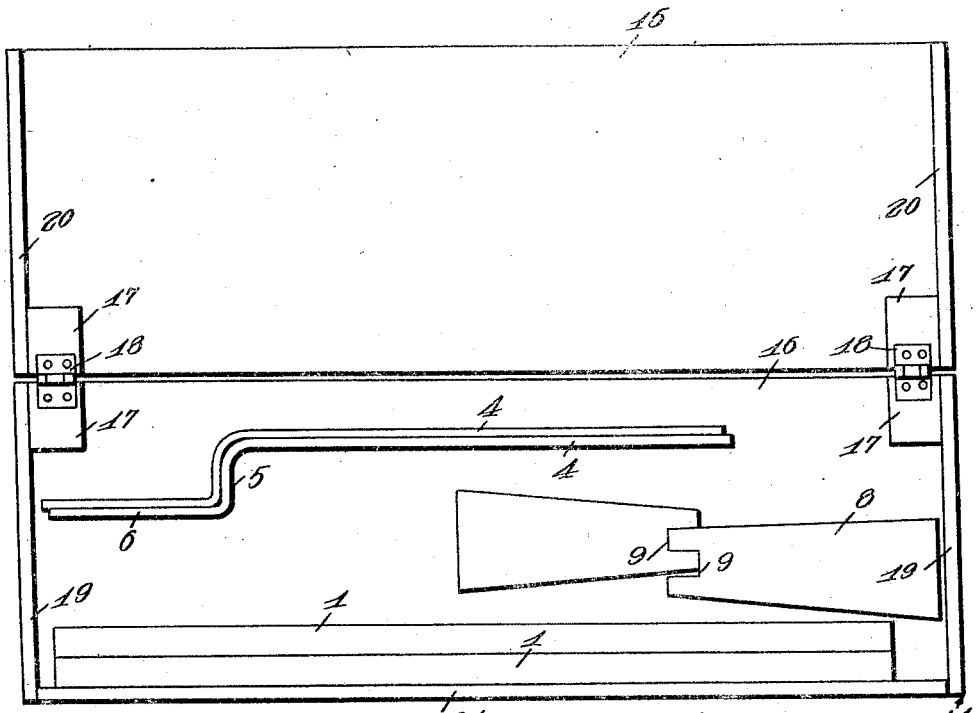
Figure 8:
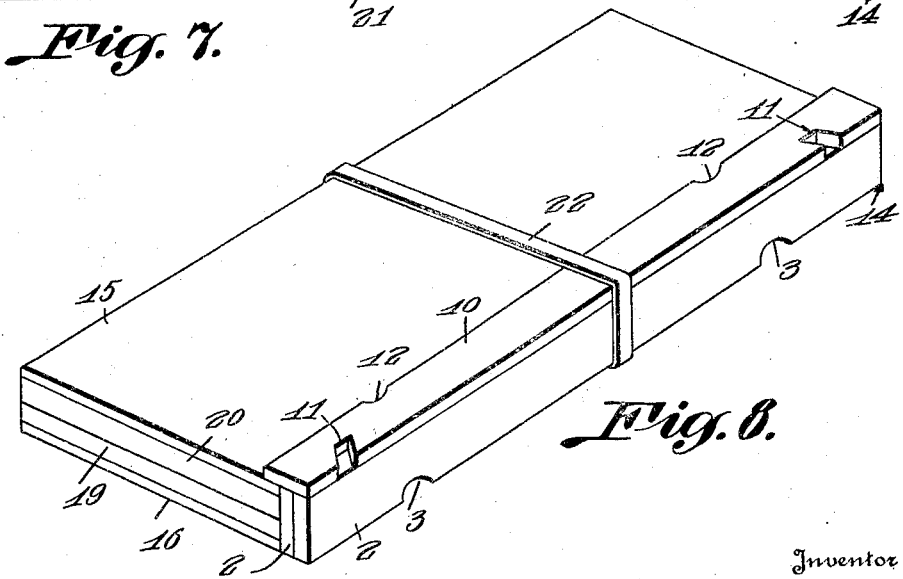

Figure 1 shows, in side elevation, a device of the class described, mounted on an automobile, parts being shown in section; Figure 2 is a perspective view wherein the foot rest is omitted; Figure 3 is a fragmental elevation showing a portion of the trestle; Figure 4 is a perspective view disclosing the trestle; Figure 5 is a cross-section showing how the transverse supports are mounted and held in place; Figure 6 is a perspective view showing the foot rest partly closed; Figure 7 is a plan showing the foot rest open, some of the parts of the device being mounted within the foot rest; Figure 8 is a perspective view showing the foot rest closed into box-like form, the entire device being packed and ready for transportation.

The device forming the subject matter of this application comprises tubular side members 1. Supports 2 are mounted on the side members 1 and are equipped in their lower edges with seats 3 adapted to receive the side members. Extensions 4 are provided and have depending arms 5 terminating in fingers 6 received within the side members 1.

For the support of the rear end of the frame above described, there is provided a trestle including legs 8 having notches 9 in their upper ends, the notches being adapted to receive the lower edge of a support or bar 10, provided in its lower edge with notches 11 adapted to receive the upper ends of the legs 8, the notches 11 and 9 interfitting, in a way which will be understood readily from the drawings. The notches 11 slant downwardly and outwardly in the bar 10, so as to give the legs an outward slant, thereby rendering the legs 8 more efficient as props. In its upper edge, the bar 10 has seats 12 wherein the rear ends of the side members 1 are mounted.

In practical operation the trestle 7 is erected on the rear seat of an automobile, the fingers 6 of the extensions 4 are received in the forward ends of the side members 1, the extensions 4 resting on the back of the front seat of the automobile, as shown in the Figure 1, the supports 2 being carried by the side members 1. The forward edge of the rear seat cushions of the automobile is carried by one of the supports 2, and the front seat cushion is carried by said support and by the foremost support, as shown in Fig. 1.

A foot rest 14 is mounted on the members 4, and this foot rest will now be described in detail.

The foot rest 14 comprises plates 15 and 16 carrying blocks 17 connected by hinges 18. The plate 15 has end strips 20 and the plate 16 has end strips 19. A closure piece 21 extends longitudinally of the plate 16 at the outer edge thereof and is located between the end strips 19. The foot rest 14 may be opened out flat, as shown in Figure 1, and be upheld by the supports 4, the member 21 operating with the outer ends of the parts 4 to prevent the foot rest from sliding to the right in Figure 1.

The extensions 4 may be placed side by side, as shown in Figure 8 and be located within the foot rest 14. The notches 9 of the legs 8 of the trestle 7 may be interengaged, and the legs may be placed in the foot rest. The side members 1 also may be placed in the foot rest, and when the parts are arranged as above described, and as shown in Figure 7, there will still remain considerable room within the foot rest for other articles. The foot rest 14 may be closed into the position shown in Figure 8 on the hinges 8, the end strips 19 on the plate 16 cooperating with the strip 20 on the plate 15 to close the ends of the box, and the member 21 cooperating with the plate 15 to close what otherwise would be the open side of the box. The supports 2 may be placed against one edge of the closed foot-rest, the thickness of the closed foot rest being equal to the width of the supports 2. The bar 10 of the trestle 7 may be overlapped on the edges of the supports 2, as shown in Figure 8, and be overlapped on the part 15 of the folded foot rest, the length of the foot-rest 14 being equal to the length of the parts 2 and 10. Around the foot rest and the elements 2 and 10 may be placed a binder in the form of a strap 22 or the like, the device being housed in the compact form shown in the Figure 8 of the drawings.

Having thus described the invention, what is claimed is:—

In a device of the class described, a trestle comprising legs and a cross-bar, means for detachably connecting the legs with the cross-bar, side members supported on the cross-bar, extensions detachably assembled with the side members, and a support extended between the side members, and a foot rest mounted on the extensions, the foot rest being foldable, the legs of the trestle, the side members and the extensions being of such length that they can be housed within the foot rest when the foot rest is folded, the support and the cross-bar of the trestle being practically equal in length to the width of the foot rest, and means for securing cross-bar and supports to the outside of the foot rest when the foot rest is folded.

In testimony that I claim the foregoing as my own, I have hereto affixed my signature.

BURTON E. HANEY.